(12) United States Patent
Schulz et al.

(10) Patent No.: US 11,274,198 B2
(45) Date of Patent: Mar. 15, 2022

(54) SCRATCH-RESISTANT STYRENE COPOLYMER COMPOSITION CONTAINING INORGANIC METAL COMPOUND NANOPARTICLES

(71) Applicant: INEOS STYROLUTION GROUP GMBH, Frankfurt am Main (DE)

(72) Inventors: Tobias Schulz, Cologne (DE); Norbert Niessner, Friedelsheim (DE); Hans-Werner Schmidt, Bayreuth (DE); Tristan Kolb, Bayreuth (DE); Sascha Ehlert, Bayreuth (DE); Stephan Foerster, Bayreuth (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 80 days.

(21) Appl. No.: 16/632,914

(22) PCT Filed: Jul. 25, 2018

(86) PCT No.: PCT/EP2018/070153
§ 371 (c)(1),
(2) Date: Jan. 22, 2020

(87) PCT Pub. No.: WO2019/020685
PCT Pub. Date: Jan. 31, 2019

(65) Prior Publication Data
US 2020/0165429 A1    May 28, 2020

(30) Foreign Application Priority Data

Jul. 26, 2017    (EP) .................................. 17183283

(51) Int. Cl.
| | |
|---|---|
| *C08L 25/08* | (2006.01) |
| *C08K 3/013* | (2018.01) |
| *C08F 212/08* | (2006.01) |
| *C08F 220/18* | (2006.01) |
| *C08F 220/44* | (2006.01) |
| *C08F 222/06* | (2006.01) |
| *C08K 3/22* | (2006.01) |
| *C08K 5/00* | (2006.01) |
| *C08L 67/00* | (2006.01) |
| *C08L 83/04* | (2006.01) |
| *C08L 83/10* | (2006.01) |
| *B82Y 30/00* | (2011.01) |
| *B82Y 40/00* | (2011.01) |

(52) U.S. Cl.
CPC ............ *C08L 25/08* (2013.01); *C08F 212/08* (2013.01); *C08F 220/18* (2013.01); *C08F 220/44* (2013.01); *C08F 222/06* (2013.01); *C08K 3/013* (2018.01); *C08K 3/22* (2013.01); *C08K 5/0041* (2013.01); *C08L 67/00* (2013.01); *C08L 83/04* (2013.01); *C08L 83/10* (2013.01); *B82Y 30/00* (2013.01); *B82Y 40/00* (2013.01); *C08K 2003/2231* (2013.01); *C08K 2003/2244* (2013.01); *C08K 2003/2296* (2013.01); *C08K 2201/003* (2013.01); *C08K 2201/011* (2013.01); *C08L 2201/00* (2013.01); *C08L 2205/03* (2013.01)

(58) Field of Classification Search
CPC .......... C08L 25/08; C08L 67/00; C08L 83/04; C08L 83/10; C08L 2201/00; C08L 2205/03; C08K 3/013; C08K 3/22; C08K 5/0041; C08K 2003/2231; C08K 2003/2244; C08K 2003/2296; C08K 2201/003; C08K 2201/011; C08F 212/08; C08F 220/18; C08F 220/44; C08F 222/06; B82Y 30/00; B82Y 40/00
USPC ........................................................ 524/588
See application file for complete search history.

(56) References Cited

U.S. PATENT DOCUMENTS

| | | | |
|---|---|---|---|
| 4,009,226 A | 2/1977 | Ott et al. | |
| 4,181,788 A | 1/1980 | Wingler et al. | |
| 8,974,898 B2 | 3/2015 | Lin | |
| 2008/0160289 A1* | 7/2008 | Lin ...................... | C09D 143/04 428/327 |
| 2009/0298991 A1 | 12/2009 | Kwon et al. | |
| 2012/0076071 A1 | 3/2012 | Kim et al. | |

FOREIGN PATENT DOCUMENTS

| | | |
|---|---|---|
| CN | 101838435 B | 9/2010 |
| EP | 2660268 A1 | 11/2013 |
| KR | 10-2010-0053905 | 3/2012 |

OTHER PUBLICATIONS

Wacharawichanant et al., "Morphology and Properties of Acrylonitrile-Butadiene-Styrene/ZnO Nanocomposites with Compatibilizer", (Macromol. Symp. 2015, vol. 354, pp. 163-169). (Year: 2015).*
S. Ehlert et al., "A General Route to Optically Transparent Highly Filled Polymer Nanocomposites", 2015, Macromolecules, vol. 48, No. 15, p. 5323-5327.

(Continued)

*Primary Examiner* — Ling Siu Choi
*Assistant Examiner* — Ronald Grinsted
(74) *Attorney, Agent, or Firm* — J.A. Lindeman & Co. PLLC

(57) ABSTRACT

A scratch-resistant thermoplastic polymer composition (P) comprising 40 to 99.9 wt.-% of at least one styrene-based copolymer, 0.1 to 20 wt.-% of at least one inorganic metal compound nanoparticle, and optionally at least one polymeric compatibilizing agent, at least one modified polysiloxane compound, at least one colorant, dye or pigment, and/or at least one further additive has improved scratch properties.

13 Claims, No Drawings

(56) References Cited

OTHER PUBLICATIONS

S. Ehlert et al., "Polymer Ligand Exchange to Control Stabilization and Compatibilization of Nanocrystals", 2014, ACS Nano, vol. 8, No. 6, p. 6114-6122.
International Preliminary Report on Patentabilty in International Application No. PCT/EP2018/070153, dated Jul. 10, 2019.

* cited by examiner

SCRATCH-RESISTANT STYRENE COPOLYMER COMPOSITION CONTAINING INORGANIC METAL COMPOUND NANOPARTICLES

The present invention relates to a thermoplastic polymer composition comprising at least one styrene-based polymer and at least one type of inorganic metal compound nanoparticle. The thermoplastic polymer composition is characterized by having improved scratch-resistance combined with good optical properties.

Styrene copolymers are widely used in many applications, e.g. in automotive industry or for household goods The popularity of these thermoplastic polymer compositions may be attributed to their balanced properties of good melt flow characteristics which is an important feature for injection molding processes, combined with a competitive price and good UV resistance. However, as with many polymers the resistance of conventional styrene copolymers against scratch and abrasion is very low. In view of this, other solutions have been established in the art for the provision of scratch-resistant surfaces of polymer articles. One solution was found in the application of poly(methyl methacrylate) (PMMA) as base polymer of the respective articles. PMMA is characterized by having good scratch resisting properties. However, compared to polystyrene and styrene copolymers, PMMA is a rather expensive material. A further solution to the above-mentioned problem is to apply a scratch-resistant curable coating (e.g. a UVcurable coating) on the surface of the polymer article. This approach, however, is typically also expensive and requires an additional processing step resulting in higher cycle time.

Different thermoplastic polymer compositions having improved scratch resistance properties are known in the art. CN 101838435 B discloses a PMMA/ASA alloy material for a PVC profile coextrusion surface layer and preparation thereof. The PMMA/ASA alloy material is prepared from chain extender, inorganic nanoparticles, coupling agent, a polymethylmethacrylate resin (PMMA) resin and acrylonitrile-styrene-acrylate grafted copolymer (ASA resin). The chain extender contains groups which can react with carboxyl groups. U.S. Pat. No. 8,974,898 discloses a coating composition comprising a) a film forming polymer having at least one reactive group; b) at least one crosslinking agent that is reactive with the film forming polymer; c) an organic liquid carrier; and d) silica nanoparticles. Upon curing of the coating composition, silica nanoparticle agglomerates are formed throughout the bulk of the cured coating composition including throughout a bulk interior of the cured coating composition, wherein the silica nanoparticle agglomerates have corresponding longest dimensions of from 100 to 1000 nm in which a majority of the longest dimensions are from 150 to 500 nm.

KR102010053905A relates to a thermoplastic resin composition containing 100 parts of base resin by weight, and 0.1-5 parts by weight of porous silica nanoparticle. The base resin is formed with 30~99 parts by weight of styrene-based resin including an epoxy group, and 1~70 parts of polyester resin.

EP-A 2 660 268 discloses a nanoparticle/polyamide composite material comprising 0.01-99 parts by weight of inorganic nanoparticles and 1-99.99 parts by weight of a polyamide matrix. The nanoparticle/polyamide composite material may be used as a polymer masterbatch.

S. Ehlert et al. reports in Macromolecules, 2015, 48 (15), pp 5323-5327 on the preparation of optically transparent highly filled polymer nanocomposites. Polymer-brushes were attached the nanoparticles via a ligand exchange method. The method was also described for the preparation of polymer nanocomposites by S. Ehlert et al. in ACS NANO, Vol. 8, No. 6, 6114-6122, 2014. Reference is also made to S. Ehlerts dissertation (University of Bayreuth, Germany, 2014).

In view of this, it was one object of the present invention to provide a styrene-based thermoplastic polymer composition with high scratch resistance without the need of an expensive coating process.

DISCLOSURE OF THE INVENTION

The present invention relates to a thermoplastic polymer composition (P) comprising (or consisting of):
 (A) 40 to 99.9 wt.-% of at least one styrene-based copolymer;
 (B) 0.1 to 20 wt.-%, preferably 0.1 to 15 wt.-%, in particular 0.1 to 10 wt.-% of at least one inorganic metal compound nanoparticle;
 (C) 0 to 50 wt.-%, preferably 0 to 40 wt.-%, in particular 0 to 35 wt.-% of at least one polymeric compatibilizing agent;
 (D) 0 to 5 wt.-%, preferably 0 to 3 wt.-%, in particular 0 to 2 wt.-% of at least one modified polysiloxane compound;
 (E) 0 to 10 wt.-% of at least one colorant, dye or pigment; and
 (F) 0 to 3 wt.-% of at least one further additive;
 wherein the constituents (A) to (F) sum up to 100 wt.-% of the thermoplastic polymer composition (P).

Each of the constituents (A) to (F) is described in detail in the following. In a preferred embodiment, the composition comprises at least one of the components (C) to (F).

It was found that the addition of small amounts of at least one type of inorganic metal compound nanoparticle, in particular 0.1 to 10 wt.-%, based on the total weight of the thermoplastic polymer composition (P), to at least one styrene-based copolymer (A) significantly improves the scratch-resistant properties of the styrene-based copolymer. It is further preferred that the at least one inorganic metal compound nanoparticles (B) are present in the thermoplastic polymer composition (P) in an amount of 0.5 to 8 wt. %, more preferably 1 to 6 wt.-% and in particular 1.5 to 4.5 wt.-%, based on the total weight of the thermoplastic polymer composition (P).

Thus, a further embodiment of the invention is a thermoplastic polymer composition (P) comprising (or consisting of):
 (A) 42 to 99.5 wt.-% of at least one styrene-based copolymer;
 (B) 0.5 to 8 wt.-% of at least one inorganic metal compound nanoparticle;
 (C) 0 to 35 wt.-% of at least one polymeric compatibilizing agent;
 (D) 0 to 2 wt.-% of at least one modified polysiloxane compound;
 (E) 0 to 10 wt.-% of at least one colorant, dye or pigment; and
 (F) 0 to 3 wt.-% of at least one further additive;
 wherein the constituents (A) to (F) sum up to 100 wt.-% of the thermoplastic polymer composition (P). In a preferred embodiment, the composition comprises at least one of the components (C) to (F).

In a further embodiment, the thermoplastic polymer composition (P) according to the invention comprises (or consists of):

(A) 44 to 99.0 wt.-% of at least one styrene-based copolymer;
(B) 1 to 6 wt.-% of at least one inorganic metal compound nanoparticle;
(C) 0 to 35 wt.-% of at least one polymeric compatibilizing agent;
(D) 0 to 2 wt.-% of at least one modified polysiloxane compound;
(E) 0 to 10 wt.-% of at least one colorant, dye or pigment; and
(F) 0 to 3 wt.-% of at least one further additive;
wherein the constituents (A) to (F) sum up to 100 wt.-% of the thermoplastic polymer composition (P).

A further embodiment of the invention relates to a thermoplastic polymer composition (P) comprising (or consisting of):
(A) 44.5 to 98.5 wt.-% of at least one styrene-based copolymer;
(B) 1.5 to 4.5 wt.-% of at least one inorganic metal compound nanoparticle;
(C) 0 to 35 wt.-% of at least one polymeric compatibilizing agent;
(D) 0 to 2 wt.-% of at least one modified polysiloxane compound;
(E) 0 to 10 wt.-% of at least one colorant, dye or pigment; and
(F) 0 to 3 wt.-% of at least one further additive;
wherein the constituents (A) to (F) sum up to 100 wt.-% of the thermoplastic polymer composition (P).

In one embodiment of the invention, the thermoplastic polymer composition (P) comprises only the constituents (A) and (B), wherein (A) and (B) sum up to 100 wt.-% of the thermoplastic polymer composition (P). In a further embodiment of the invention, the thermoplastic polymer composition (P) comprises only the constituents (A), (B), and optionally (E) and (F) wherein constituents (A), (B), (E) and (F) sum up to 100 wt.-% of the thermoplastic polymer composition (P).

In an alternative embodiment of the invention, it was found by the inventors that the scratch-resistant properties of the thermoplastic polymer composition (P) comprising the constituents (A) and (B) may also be improved by the addition of at least one polymeric compatibilizing agent (C). It was found that amounts of 1 to 35 wt.-%, preferably 10 to 35 wt.-%, based on the weight of the total thermoplastic polymer composition (P), of at least one polymeric compatibilizing agent (C) result in further improved properties of the thermoplastic polymer composition (P).

Thus, a further object of the invention is a thermoplastic polymer composition (P) comprising (or consisting of):
(A) 40 to 98.9 wt.-% of at least one styrene-based copolymer;
(B) 0.1 to 10 wt.-% of at least one inorganic metal compound nanoparticle;
(C) 1 to 35 wt.-% of at least one polymeric compatibilizing agent;
(D) 0 to 2 wt.-% of at least one modified polysiloxane compound;
(E) 0 to 10 wt.-% of at least one colorant, dye or pigment; and
(F) 0 to 3 wt.-% of at least one further additive;
wherein the constituents (A) to (F) sum up to 100 wt.-% of the thermoplastic polymer composition (P).

In a further preferred embodiment of this object of the invention the thermoplastic polymer composition (P) comprises (or consists of):
(A) 42 to 98.5 wt.-% of at least one styrene-based copolymer;
(B) 0.5 to 8 wt.-% of at least one inorganic metal compound nanoparticle;
(C) 1 to 35 wt.-% of at least one polymeric compatibilizing agent;
(D) 0 to 2 wt.-% of at least one modified polysiloxane compound;
(E) 0 to 10 wt.-% of at least one colorant, dye or pigment; and
(F) 0 to 3 wt.-% of at least one further additive;
wherein the constituents (A) to (F) sum up to 100 wt.-% of the thermoplastic polymer composition (P).

In a further preferred embodiment of this object of the invention the thermoplastic polymer composition (P) comprises (or consists of):
(A) 42 to 89.5 wt.-% of at least one styrene-based copolymer;
(B) 0.5 to 8 wt.-% of at least one inorganic metal compound nanoparticle;
(C) 10 to 35 wt.-% of at least one polymeric compatibilizing agent;
(D) 0 to 2 wt.-% of at least one modified polysiloxane compound;
(E) 0 to 10 wt.-% of at least one colorant, dye or pigment; and
(F) 0 to 3 wt.-% of at least one further additive;
wherein the constituents (A) to (F) sum up to 100 wt.-% of the thermoplastic polymer composition (P).

In one embodiment of the invention, the thermoplastic polymer composition (P) comprises only the constituents (A), (B) and (C), wherein (A), (B) and (C) sum up to 100 wt.-% of the thermoplastic polymer composition (P).

In a further embodiment of the invention, the thermoplastic polymer composition (P) comprises only the constituents (A), (B), (C) and optionally (E) and (F) wherein constituents (A), (B), (C), (E) and (F) sum up to 100 wt.-% of the thermoplastic polymer composition (P).

Moreover, the inventors found that properties of the thermoplastic polymer composition (P) may further be improved if small amounts of at least one modified polysiloxane compound (D) are added to the composition. It was found that 0.1 to 2 wt.-%, preferably 0.5 to 2 wt.-%, and in particular 0.5 to 1.5 wt.-%, based on the total weight of the thermoplastic polymer composition (P), of at least one modified polysiloxane compound (D) is sufficient to achieve improved scratch resistance properties.

Thus, a further object of the present invention is a thermoplastic polymer composition (P) comprising (or consisting of):
(A) 40 to 99.8 wt.-% of at least one styrene-based copolymer;
(B) 0.1 to 20 wt.-%, preferably 0.1 to 15 wt.-%, in particular 0.1 to 10 wt.-% of at least one inorganic metal compound nanoparticle;
(C) 0 to 50 wt.-%, preferably 0 to 40 wt.-%, in particular 0 to 35 wt.-% of at least one polymeric compatibilizing agent;
(D) 0.1 to 2 wt.-% of at least one modified polysiloxane compound;
(E) 0 to 10 wt.-% of at least one colorant, dye or pigment; and
(F) 0 to 3 wt.-% of at least one further additive;
wherein the constituents (A) to (F) sum up to 100 wt.-% of the thermoplastic polymer composition (P).

Thus, a further object of the present invention is a thermoplastic polymer composition (P) comprising (or consisting of):
(A) 42 to 99.0 wt.-% of at least one styrene-based copolymer;
(B) 0.5 to 8 wt.-% of at least one inorganic metal compound nanoparticle;
(C) 0 to 40 wt.-%, preferably 0 to 35 wt.-% of at least one polymeric compatibilizing agent;
(D) 0.5 to 2 wt.-% of at least one modified polysiloxane compound;
(E) 0 to 10 wt.-% of at least one colorant, dye or pigment; and
(F) 0 to 3 wt.-% of at least one further additive;
wherein the constituents (A) to (F) sum up to 100 wt.-% of the thermoplastic polymer composition (P).

In a preferred embodiment of this object of the invention, the thermoplastic polymer composition (P) comprises (or consists of):
(A) 47 to 97.5 wt.-% of at least one styrene-based copolymer;
(B) 1 to 6 wt.-% of at least one inorganic metal compound nanoparticle;
(C) 0 to 40 wt.-%, preferably 0 to 35 wt.-% of at least one polymeric compatibilizing agent;
(D) 0.5 to 2 wt.-% of at least one modified polysiloxane compound;
(E) 0.5 to 8 wt.-% of at least one colorant, dye or pigment; and
(F) 0.5 to 2 wt.-% of at least one further additive;
wherein the constituents (A) to (F) sum up to 100 wt.-% of the thermoplastic polymer composition (P).

In one embodiment of the invention, the thermoplastic polymer composition (P) comprises only the constituents (A), (B) and (D), wherein (A), (B) and (D) sum up to 100 wt.-% of the thermoplastic polymer composition (P). In a further embodiment of the invention, the thermoplastic polymer composition (P) comprises only the constituents (A), (B), (D) and optionally (E) and (F), wherein constituents (A), (B), (D), (E) and (F) sum up to 100 wt.-% of the thermoplastic polymer composition (P).

In addition to the previous embodiments of the invention, a further object of the invention is a thermoplastic polymer composition (P) comprising at least one styrene-based copolymer (A), at least one inorganic metal compound nanoparticle (B), at least one polymeric compatibilizing agent (C) and at least one modified polysiloxane (D) in combination. The thermoplastic polymer composition (P) may further comprise at least one colorant, dye or pigment (E), and/or at least one further additive (F). In this case, the previously mentioned amounts and preferred amounts apply.

Thus, in one embodiment, the invention relates to a thermoplastic polymer composition (P) comprising (or consisting of):
(A) 42 to 89 wt.-% of at least one styrene-based copolymer;
(B) 0.5 to 8 wt.-% of at least one inorganic metal compound nanoparticle;
(C) 10 to 35 wt.-% of at least one polymeric compatibilizing agent;
(D) 0.5 to 2 wt.-% of at least one modified polysiloxane compound;
(E) 0 to 10 wt.-% of at least one colorant, dye or pigment; and
(F) 0 to 3 wt.-% of at least one further additive;
wherein the constituents (A) to (F) sum up to 100 wt.-% of the thermoplastic polymer composition (P).

Preferably, the thermoplastic polymer composition (P) comprises (or consists of):
(A) 46.5 to 86.5 wt.-% of at least one styrene-based copolymer;
(B) 1 to 6 wt.-% of at least one inorganic metal compound nanoparticle;
(C) 12 to 33 wt.-% of at least one polymeric compatibilizing agent;
(D) 0.5 to 1.5 wt.-% of at least one modified polysiloxane compound;
(E) 0 to 10 wt.-% of at least one colorant, dye or pigment; and
(F) 0 to 3 wt.-% of at least one further additive;
wherein the constituents (A) to (F) sum up to 100 wt.-% of the thermoplastic polymer composition (P).

In a further preferred embodiment, the thermoplastic polymer composition (P) comprises (or consists of):
(A) 49.5 to 85.5 wt.-% of at least one styrene-based copolymer;
(B) 1 to 6 wt.-% of at least one inorganic metal compound nanoparticle;
(C) 12 to 33 wt.-% of at least one polymeric compatibilizing agent;
(D) 0.5 to 1.5 wt.-% of at least one modified polysiloxane compound;
(E) 0.5 to 8 wt.-% of at least one colorant, dye or pigment; and
(F) 0.5 to 2 wt.-% of at least one further additive;
wherein the constituents (A) to (F) sum up to 100 wt.-% of the thermoplastic polymer composition (P).

In the following, the constituents (A) to (F) are described in further detail.

Styrene-Based Copolymer (Constituent A)

Styrene-based copolymers are well known in the art and typically represent copolymers of styrene and/or α-methyl styrene with suitable co-monomers. In a preferred embodiment, co-monomers having polar functional groups are preferred, e.g. as acrylonitrile, meth acrylonitrile, methyl methacrylate, maleic acid anhydride and N-phenylmaleimide. Particular preferred co-monomers are acrylonitrile, methacrylonitrile, and methyl methacrylate. Most preferred co-monomers are acrylonitrile and methyl methacrylate. Particular suitable styrene-based copolymer (A) within the meaning of this invention are thus copolymers from styrene and/or α-methyl styrene and acrylonitrile and/or methyl methacrylate as comonomer.

In a preferred embodiment of the invention, the thermoplastic polymer composition (P) comprises at least one styrene-based copolymer (A) selected from poly(styrene-co-acrylonitrile) (SAN), poly(α-methyl styrene-co-acrylonitrile) (AMSAN), poly(styrene-co-methyl methacrylate) (SMMA) and mixtures thereof.

Poly(styrene-acrylonitrile) (SAN) and/or poly(α-methyl styrene/acrylonitrile) (AMSAN) are copolymers known in the art. In general, any SAN and/or AMSAN copolymer known in the art may be used within the subject-matter of the present invention.

In a preferred embodiment, the SAN and AMSAN copolymers of the present invention contain:
from 50 to 99 wt.-%, based on the total weight of the SAN and/or AMSAN copolymer, of at least one member selected from the group consisting of styrene and α-methyl styrene, and
from 1 to 50 wt.-%, based on the total weight of the SAN and/or AMSAN copolymer, of acrylonitrile.

The weight average molecular weight (as determined by gel permeation chromatography relative to polystyrene as standard and THF as solvent) of the SAN or AMSAN copolymer is often in the range of 15,000 to 200,000 g/mol, preferably in the range of 30,000 to 150.000 g/mol.

Particularly preferred ratios by weight of the components making up the SAN or AMSAN copolymer are 60 to 95 wt.-%, based on the total weight of the SAN and/or AMSAN copolymer, of styrene and/or α-methyl styrene and 40 to 5 wt.-%, based on the total weight of the SAN and/or AMSAN copolymer, of acrylonitrile.

Particularly preferred are SAN or AMSAN containing proportions of incorporated acrylonitrile monomer units of ≤36 wt.-%, based on the total weight of the SAN and/or AMSAN copolymer.

Preferred are copolymers as component made from, based on
- from 65 to 81 wt.-%, based on the total weight of the SAN and/or AMSAN copolymer, of at least one member selected from the group consisting of styrene and α-methyl styrene, and
- from 19 to 35 wt.-%, based on the total weight of the SAN and/or AMSAN copolymer, of acrylonitrile.

Among the afore-mentioned, most preferred SAN or AMSAN copolymers those having a viscosity number VN (determined according to DIN 53726 at 25° C., 0.5% by weight in dimethylformamide) of from 50 to 120 ml/g are in particular preferred.

The copolymers of SAN or AMSAN component are known and the methods for their preparation, for instance, by radical polymerization, more particularly by emulsion, suspension, solution and bulk polymerization are also well documented in the literature.

Details concerning the production of these resins are described e.g. in U.S. Pat. Nos. 4,009,226 and 4,181,788. Vinyl resins produced by bulk polymerization or solution polymerization have proved to be particularly suitable. The copolymers may be added alone or as an arbitrary mixture.

Poly(styrene-co-methyl methacrylate) (SMMA) within the meaning of the present invention is any copolymer of methyl methacrylate and styrene. Typical SMMA copolymers are known in the art. In general, any SMMA copolymer known in in the art may be used within the subject-matter of the present invention.

In a preferred embodiment, the SMMA copolymer comprises at least one copolymer obtained by the polymerization of 70 to 90 wt.-%, based on the total weight of the monomer composition, of styrene and 10 to 30 wt.-%, based on the total weight of the monomer composition, of methyl methacrylate. In a further preferred embodiment, the amount of styrene is from 70 to 85 wt.-% and the amount of methyl methacrylate is from 15 to 30 wt.-%. In particular preferred SMMA copolymers, the amount of styrene is from 70 to 80 wt.-% and the amount of methyl methacrylate is from 20 to 30 wt.-%. Most preferred are SMMA copolymers wherein the amount present of styrene is from 74 to 80 wt.-% and the amount present of methyl methacrylate is from 20 to 26 wt.-%.

Inorganic Metal Compound Nanoparticle (Constituent B)

In general, all types of inorganic metal compound nanoparticles (B) are applicable in the present invention, i.e. main group inorganic metal compound nanoparticles (B) as well as transition metal nanoparticles, as long as the average particle diameter is within the range of nanometer scale, preferably in the range of 1 to 150 nm, preferably in the range of 10 to 120 nm.

Preferred inorganic metal compound nanoparticles (B) are selected from inorganic metal oxide nanoparticles and inorganic metal carbide particles.

Suitable inorganic metal oxide nanoparticles may be selected from metal oxides comprising at least one main group metal and/or transition group metal, in particular Ti, Zr, Hf, V, Nb, Ta, Cr, Mo, W, Mn, Fe, Co, Ni, Cu, Zn, B, Al, Si, Sn, Pb, Mg, and Ca. More preferred are metal oxides comprising at least one metal selected from Ti, Zr, Cr, Mo, W, Mn, Fe, Zn, B, Al, Si, and Sn, and in particular Ti, Zr, Fe, Zn, Al, and Si. Preferred examples are inorganic metal compound nanoparticles of $ZrO_2$, $ZnO$, $Al_2O_3$, and $SnO_2$.

Suitable inorganic metal carbide nanoparticles may be selected from metal carbides comprising at least one main group metal and/or transition group metal, in particular Ti, Zr, Hf, V, Nb, Ta, Cr, Mo, W, Mn, Fe, Co, Ni, Cu, Zn, B, Al, Si, Mg, and Ca. More preferred are covalent or interstitial metal carbides, in particular metal carbides comprising at least one metal selected from Ti, Zr, Cr, Mo, W, Fe, Zn, B, Al, and Si, and in particular Ti, W, Al, and Si. Particular preferred examples are inorganic nanoparticles of WC and SiC.

In a preferred embodiment of the invention, the inorganic metal compound nanoparticles (B) are selected from ZnO, $SnO_2$, and $ZrO_2$ nanoparticles having an average particle diameter of between 10 and 120 nm.

The inorganic metal compound nanoparticles (B) may be prepared by any method known in the art. Alternatively, commercially available nanoparticles may be employed. In a preferred embodiment, oxidation of organic or inorganic metal salts is used for the preparation of the inorganic metal oxide nanoparticles.

Polymeric Compatibilizing Agent (Constituent C)

In one preferred embodiment, the thermoplastic polymer composition (P) further comprises at least one polymeric compatibilizing agent. The polymeric compatibilizing agent (C) is typically used to improve the contact between the styrene-based copolymer (A) and the inorganic metal compound nanoparticle. However, it was surprisingly found that the polymeric compatibilizing agent (C) is also appropriate to improve the scratch resistance of the thermoplastic polymer composition (P).

In accordance with the present invention, a polymeric compatibilizing agent (C) is used. In particular, the polymeric compatibilizing agent (C) combines polymeric moieties, which advantageously interact with the styrene-based copolymers and polar moieties having functional groups suited to interact with the surface of the inorganic metal compound nanoparticles (B). By this combination, a good compatibilization between the polymer matrix, i.e. the styrene-based copolymer (A), and the inorganic metal compound nanoparticles (B) accompanied by outstanding scratch resistance properties are achieved.

It is particularly preferred that the polymeric moieties of the polymeric compatibilizing agents and the styrene-based copolymer (A) are derived from at least one monomer which both, the styrene-based copolymer (A) and the polymer moieties of the polymeric compatibilizing agent (C), have in common. In a preferred embodiment, the polymeric moieties are composed of substantially the same monomer repeating units in the styrene-based copolymer (A) and the polymer moieties of the polymeric compatibilizing agent (C). Thus, the polymeric compatibilizing agent (C) preferably comprises moieties derived from styrene and/or α-methyl styrene with suitable co-monomers. In a preferred embodiment, co-monomers having polar functional groups are preferred, e.g. acrylonitrile, meth acrylonitrile, methyl methacrylate, maleic acid anhydride and N-phenylmaleimide. Particular preferred co-monomers are acrylonitrile, meth acrylonitrile, and methyl methacrylate. Most preferred co-monomers are acrylonitrile and methyl methacrylate.

Moreover, the polymeric compatibilizing agent (C) comprises at least one moiety which is suitable to interact with the surface of the inorganic metal compound nanoparticles (B). The term "interact" in this case includes weak interaction, such as Van-der-Waals interactions, dipole-dipole interactions, or electrostatic interactions, as well as strong interactions from covalent or ionic bonds. In a preferred embodiment, covalent bonds are formed between the polymeric compatibilizing agent (C) and the surface of inorganic metal compound nanoparticles (B). In order to achieve this, suitable functional groups are required to be present in the polymeric compatibilizing agent (C). This is advantageously achieved by copolymerizing an appropriate comonomer having a convenient functional group. In a preferred embodiment, a polymerizable carboxylic acid is copolymerized with at least styrene and/or α-methyl styrene.

More preferable is a copolymer of styrene and/or α-methyl styrene with acrylonitrile, meth acrylonitrile, and/or methyl methacrylate and a polymerizable carboxylic acid, preferably maleic acid anhydride or maleic acid. Most preferred are copolymers of styrene, acrylonitrile and maleic acid anhydride or maleic acid.

These copolymers, i.e. polymeric compatibilizing agents (C), are conveniently prepared by a free radical polymerization in an emulsion polymerization or suspension polymerization process. The resulting polymeric compatibilizing agents (C) consequently contains maleic acid repeating units instead of maleic acid anhydride repeating units due to the reaction of the anhydride with water from the reaction mixture. Alternatively, these copolymers may be prepared in a mass polymerization process e.g. in a free radical polymerization or an anionic polymerization. In this case, the resulting polymeric compatibilizing agents (C) typically comprise maleic acid anhydride repeating units due to the absence of water as solvent. However, in view of the presence of water e.g. in the ambient air, the obtained polymeric compatibilizing agents (C) often comprise both, maleic acid anhydride repeating units as well as maleic acid repeating units.

Preferably, the polymeric compatibilizing agents (C) are prepared by copolymerizing a monomer composition having the following composition:
C-i 60 to 90 wt.-% of styrene,
C-ii 9.5 to 30 wt.-% of acrylonitrile, and
C-iii 0.5 to 10 wt.-% of maleic acid anhydride,
wherein C-i, C-ii and C-iii sum up to 100 wt.-%.

More preferred are polymeric compatibilizing agents (C) prepared by copolymerizing a monomer composition having the following composition:
C-i 68 to 80 wt.-% of styrene,
C-ii 19.5 to 27 wt.-% of acrylonitrile, and
C-iii 0.5 to 5 wt.-% of maleic acid anhydride,
wherein C-i, C-ii and C-iii sum up to 100 wt.-%.

Particular preferred are polymeric compatibilizing agents (C) prepared by copolymerizing a monomer composition having the following composition:
C-i 71.5 to 77 wt.-% of styrene,
C-ii 22 to 26 wt.-% of acrylonitrile, and
C-iii 1.0 to 2.5 wt.-% of maleic acid anhydride,
wherein C-i, C-ii and C-iii sum up to 100 wt.-%.

In a particular preferred embodiment, the polymeric compatibilizing agent (C) is prepared by copolymerizing the above-mentioned monomer composition in an emulsion polymerization process, wherein seed latex is first prepared from about 1 to 8 wt.-% of the entire styrene and 1 to 8 wt.-% of the entire acrylonitrile in the absence of maleic acid anhydride. The remaining monomers are added to the seed latex after its preparation. During the emulsion polymerization process, the maleic acid anhydride is protonated by the water present in the reaction mixture. Thus, a protonated maleic acid copolymer is formed. The obtained copolymer is thus a poly(styrene-co-acrylonitrile-comaleic acid) terpolymer. This terpolymer is a particularly preferred polymeric compatibilizing agent (C) according to the present invention.

The polymeric compatibilizing agent (C) may be added to the thermoplastic polymer composition (P) together with the constituents A, B, and D to F if present during preparation of the thermoplastic polymer composition (P). However, in a preferred embodiment of the invention, the inorganic metal compound nanoparticles (B) and the polymeric compatibilizing agent (C) are reacted with each other prior to the preparation of the thermoplastic polymer composition (P) in order to achieve a sufficient interaction.

Modified Polysiloxane Compound (Constituent D)

In one embodiment of the invention, the thermoplastic polymer composition (P) comprises small amounts, e.g. 0 to 2 wt.-%, preferably 0.5 to 2 wt.-%, in particular 0.5 to 1.5 wt.-%, based on the entire weight of the thermoplastic polymer composition (P), of at least one modified polysiloxane compound (D).

The modified polysiloxane compound (D) is preferably represented by a polysiloxane compound comprising polymeric moieties which are derived from monomers comprising functional groups other than olefinic functional groups. Suitable polymeric moieties comprise ester groups, and acrylic ester groups. In a particular preferred embodiment, the at least one modified polysiloxane compound (D) is a polyester modified polysiloxane. It is further preferred that the at least one organopolysiloxane compound is a polyester-polysiloxane-block copolymer.

Suitable examples of the polyester-polysiloxane-blockcopolymer preferably comprise polysiloxane moieties derived from repeating units having the following formula (Ia):

wherein each $R^1$ is independently selected from a linear or branched, saturated or unsaturated hydrocarbon group having 1 to 10, preferably 1 to 6, carbon atoms.

In a preferred embodiment, each $R^1$ is identical and selected from a linear or branched, saturated hydrocarbon group having 1 to 6 carbon atoms.

Preferred examples of the polysiloxane moieties comprised in the polyesterpolysiloxane-blockcopolymer are derived from poly(dimethylsiloxane), poly(diethylsiloxane), poly(dipropylsiloxane), poly(dibutylsiloxane), and mixtures thereof.

In a further preferred embodiment, the polyester moiety of the polyester modified polysiloxane compound (D) is derived from repeating units having the following formula (II):

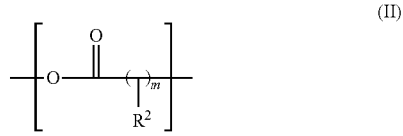

wherein $R^2$ is independently selected from a hydrogen atom and a linear or branched, saturated or unsaturated hydrocarbon group having 1 to 10, preferably 1 to 6, carbon atoms, and m is an integer from 1 to 10, preferably 1 to 5.

In a preferred embodiment, $R^2$ represents a hydrogen atom.

In a preferred embodiment, the at least one modified polysiloxane compound (B) is a [polyester-b-polysiloxane-b-polyester] triblock copolymer.

In a further embodiment of the invention, the at least one modified polysiloxane compound (D) is preferably a [polyester-b-polysiloxane-b-polyester] triblock copolymer represented by the following formula (III):

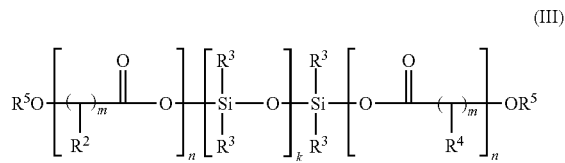

wherein $R^3$, $R^4$ and m have the same meaning as defined above;

$R^5$ is selected from a hydrogen atom and a linear or branched, saturated or unsaturated hydrocarbon group having 1 to 10, preferably 1 to 6, carbon atoms;

and k and n are integers from 1 to 500, preferably 1 to 250.

In a particular preferred embodiment, the at least one modified polysiloxane compound (D) is a [polyester-b-polysiloxane-b-polyester] triblock copolymer represented by formula (III), wherein $R^3$ is selected from a linear or branched, saturated hydrocarbon group having 1 to 6 carbon atoms;

$R^4$ and $R^5$ represent hydrogen atoms;

m is an integer from 1 to 10, preferably 1 to 5;

and k and n are integers from 5 to 250.

In an alternative preferred embodiment, the at least one modified polyester-polysiloxane compound (D) comprises polysiloxane moieties derived from repeating units having the above-defined formula (Ia) and from repeating units having the following formula (Ib):

wherein $R^1$ is defined as above and $R^6$ represents a polyester moiety of the polyester modified polysiloxane compound (D) is derived from repeating units having the above-defined formula (II). The repeating units of formula (Ib) are statistically distributed within the polysiloxane moieties and amount to 1 to 50 wt.-%, preferably 2 to 30 wt.-%, in particular 3 to 15 wt.-%, based on the entire weight of the polysiloxane moieties. Thus, the alternative embodiment relates to a block copolymer having a brush structure.

The at least one modified polysiloxane compound (D) preferably has a weight average molecular weight Mw of 20,000 g/mol to 1,000,000 g/mol. In a preferred embodiment, the at least one modified organopolysiloxane compound (B) has either a molecular weight Mw of about 25,000 50,000 g/mol, in particular 35,000 to 45,000 g/mol, or a ultra-high molecular weight of 100,000 g/mol to 1,000,000 g/mol, more preferred 300.000 g/mol to 900.000 g/mol, determined by gel permeation chromatography (GPC) relative to polystyrene as standard and THF as solvent.

The melting point of the modified polysiloxane compound (D) is preferably in a range between 20° C. and 100° C., more preferably between 40° C. and 70° C. and in particular in the range between 50° C. and 60° C., otherwise determined under ambient conditions.

The polyester modified polysiloxane compound (D) may be produced by any polymerization process known in the art. Preferably, the modified polysiloxane compound (D) may be obtained by co-polymerization of appropriate siloxane monomeric units with monomeric units which are appropriate to form polyester moieties, e.g. in a polycondensation reaction of polyfunctional alcohols and polyfunctional carboxylic acids or salts thereof. All monomers may be mixed and polymerized in one step. Alternatively, the polymerization of the siloxane monomers or the ester-building monomers may be effected in a separate step and the other monomer may be graft-polymerized thereto. It is also possible to provide macro monomer of both, the polysiloxane and the polyester moieties, and obtain the polyester modified polysiloxane compound (D) in a final coupling reaction, e.g. a condensation or transesterification step.

Dyes, Pigments, Colorants (Constituent E)

The thermoplastic polymer composition (P) may further comprise 0 to 10 wt.-% of dyes, pigments, or colorants (E) which may be added in form of master batches comprising the dyes, pigments, or colorants (E) in a polymer matrix. In a preferred embodiment, the dyes, pigments, or colorants (E) are added in form of a master batch comprising 20 to 70 wt.-%, preferably 40 to 60 wt.-%, based on the total amount of the master batch, of dyes, pigments, colorants (E) or mixtures thereof and 30 to 80 wt.-%, preferably 40 to 60 wt.-%, based on the total amount of the master batch, a copolymer of an vinyl aromatic olefin and acrylonitrile as matrix polymer. Preferably, the matrix polymer is selected from poly(styrene-acrylonitrile) (SAN), poly(α-methyl styrene/acrylonitrile) (AMSAN) and/or poly(styrene-methyl methacrylate) (SMMA).

Examples of suitable pigments include titanium dioxide, phthalocyanines, ultramarine blue, iron oxides or carbon black, and also the entire class of organic pigments.

Examples of suitable colorants include all dyes that may be used for the transparent, semi-transparent, or non-transparent coloring of polymers, in particular those suitable for coloring styrene copolymers.

Additives (Constituent F)

Various additives (F) may be added to the molding compounds in amounts of from 0 to 3 wt.-%, often from 0.1 to 3 wt.-% or from 0.5 to 2 wt.-%, as assistants and processing additives. Suitable additives (F) include all substances customarily employed for processing or finishing the polymers. In general, the presence of inorganic metal compound nanoparticles (B), polymeric compatibilizing agents (C) and/or modified polysiloxane compounds (D) does not exclude the presence of additives (D) comprising inorganic metal compound nanoparticles, polymeric compatibilizing agents and/or modified polysiloxane compounds which are different from the inorganic metal compound nanoparticles (B), the polymeric compatibilizing agents (C) and/or the modified polysiloxane compounds (D).

Additives (F) may be added in form of master batches comprising additives (F) in a polymer matrix. In a preferred embodiment, the additives (F) are added in form of a master batch comprising 20 to 70 wt.-%, preferably 40 to 60 wt.-%, based on the total amount of the master batch, of additives (F) or mixtures thereof and 30 to 80 wt.-%, preferably 40 to 60 wt.-%, based on the total amount of the master batch, a copolymer of an vinylaromatic olefin and acrylonitrile as matrix polymer. Preferably, the matrix polymer is selected from poly(styrene-acrylonitrile) (SAN), poly(α-methyl styrene/acrylonitrile) (AMSAN), and/or poly(styrene-methyl methacrylate) (SMMA).

Examples include, for example, antistatic agents, antioxidants, flame retardants, stabilizers for improving thermal stability, stabilizers for increasing photostability, stabilizers for enhancing hydrolysis resistance and chemical resistance, anti-thermal decomposition agents and in particular lubricants that are useful for production of molded bodies/articles. These further added substances may be admixed at any stage of the manufacturing operation, but preferably at an early stage in order to profit early on from the stabilizing effects (or other specific effects) of the added substance. For further customary assistants and added substances, see, for example, "Plastics Additives Handbook", Ed. Hans Zweifel, 6th Edition, Hanser Publishers, Munich, 2009.

Examples of suitable antistatic agents include amine derivatives such as N,N-bis(hydroxyalkyl)alkylamines or-alkyleneamines, polyethylene glycol esters, copolymers of ethylene oxide glycol and propylene oxide glycol (in particular two-block or three-block copolymers of ethylene oxide blocks and propylene oxide blocks), and glycerol mono- and distearates, and mixtures thereof.

Examples of suitable antioxidants include sterically hindered monocyclic or polycyclic phenolic antioxidants which may comprise various substitutions and may also be bridged by substituents. These include not only monomeric but also oligomeric compounds, which may be constructed of a plurality of phenolic units. Hydroquinones and hydroquinone analogs are also suitable, as are substituted compounds, and also antioxidants based on tocopherols and derivatives thereof. It is also possible to use mixtures of different antioxidants. It is possible in principle to use any compounds which are customary in the trade or suitable for styrene copolymers, for example antioxidants from the Irganox range. In addition to the phenolic antioxidants cited above by way of example, it is also possible to use so-called co-stabilizers, in particular phosphorus- or sulfur-containing co-stabilizers. These phosphorus- or sulfur-containing co-stabilizers are known to those skilled in the art.

Examples of suitable flame retardants that may be used include the halogen-containing or phosphorus-containing compounds known to the person skilled in the art, magnesium hydroxide, and also other commonly used compounds, or mixtures thereof.

Examples of suitable light stabilizers include various substituted resorcinols, salicylates, benzotriazoles and benzophenones.

Suitable matting agents include not only inorganic substances such as talc, glass beads or metal carbonates (for example $MgCO_3$, $CaCO_3$) but also polymer particles, in particular spherical particles having diameters $D_{50}$ greater than 1 µm, based on, for example, methyl methacrylate, styrene compounds, acrylonitrile or mixtures thereof. It is further also possible to use polymers comprising copolymerized acidic and/or basic monomers.

Examples of suitable anti-drip agents include polytetrafluoroethylene (Teflon) polymers and ultrahigh molecular weight polystyrene (weight-average molecular weight Mw above 2,000,000 g/mol).

Examples of fibrous/pulverulent fillers include carbon or glass fibers in the form of glass fabrics, glass mats, or filament glass rovings, chopped glass, glass beads, and wollastonite, particular preference being given to glass fibers. When glass fibers are used they may be finished with a sizing and a coupling agent to improve compatibility with the blend components. The glass fibers incorporated may either take the form of short glass fibers or else continuous filaments (rovings).

Examples of suitable particulate fillers include carbon black, amorphous silica, magnesium carbonate, powdered quartz, mica, bentonites, talc, feldspar or, in particular, calcium silicates, such as wollastonite, and kaolin.

Examples of suitable stabilizers include hindered phenols but also vitamin E and compounds having analogous structures and also butylated condensation products of pcresol and dicyclopentadiene. HALS stabilizers (Hindered Amine Light Stabilizers), benzophenones, resorcinols, salicylates, benzotriazoles are also suitable. Other suitable compounds include, for example, thiocarboxylic esters. Also usable are $C_6$-$C_{20}$ alkyl esters of thiopropionic acid, in particular the stearyl esters and lauryl esters. It is also possible to use the dilauryl ester of thiodipropionic acid (dilauryl thiodipropionate), the distearyl ester of thiodipropionic acid (distearyl thiodipropionate) or mixtures thereof. Examples of further additives include HALS absorbers, such as bis(2,2,6,6-tetramethyl-4-piperidyl) sebacate or UV absorbers such as 2H-benzotriazol-2-yl-(4-methylphenol). Such additives are typically used in amounts of from 0.01 to 2 wt.-% (based on the overall mixture).

Suitable lubricants and demolding agents include stearic acids, stearyl alcohol, stearic esters, amide waxes (bis(stearylamide)), polyolefin waxes and/or generally higher fatty acids, derivatives thereof and corresponding fatty acid mixtures comprising 12 to 30 carbon atoms. Also particularly suitable is ethylene-bis(stearamide). The amounts of these additives are preferably in the range of from 0.05 to 3 wt.-%.

Preparation of the Thermoplastic Polymer Composition (P)

The invention also relates to a process for preparing a thermoplastic polymer composition (P) disclosed above, wherein the process comprises at least the following steps:

a) Providing the components (A) to (F) in the predetermined amounts to an optionally heatable mixing device; and b) Blending the components (A) to (F) in the optionally heatable mixing device at temperatures above the glass transition point of the components (A) to (F) to obtain the thermoplastic polymer composition (P).

Optionally, a step in which a homogenous particulate material mixture is prepared from the components (A) to (F) may be carried out prior to step b). However, also when provided to the optionally heatable mixing device without previous mixing, a homogenous mixing is typically achieved in the optionally heatable mixing device.

Components (A) to (F) are typically provided in form of particulate materials having different particle sizes and particle size distributions. Typically, the components are provided in form of powders and/or granules. These may, for example, be chosen with respect to their commercial availability.

As previously described, the inorganic metal compound nanoparticles (B) and polymeric compatibilizing agent (C), if present, may be reacted prior to the admixing of with the further constituents present, in particular prior to the admixing with the at least one styrene-based copolymer (A) the thermoplastic polymer composition (P).

The reaction is preferably carried out in a process as follows: Both constituents (B) and (C) are provided in form of a solution in an appropriate solvent, e.g. ether such as diethyl ether, methyl-tert-butyl ether, tetrahydrofuran. Particular preferred is tetrahydrofuran. Both solutions are combined in volumes which allow a mass ratio of constituent (B) to constituent (C) of 1:4 to 1:14, preferably 1:6 to 1:12, and more preferred 1:8 to 1:12. In an particular preferred embodiment, the mass ratio (B):(C) is 1:10.

The reaction mixture is stirred for 0.1 to 10, preferably 1 to 5 hours and precipitated. The resulting nanoparticles are precipitated by adding an alcohol, preferably methanol or ethanol, in particular cold methanol. The precipitate is separated and dried. The resulting solid may then be added to the thermoplastic polymer composition (P).

The particulate constituents (A) to (F) are provided to a mixing device in the required amounts and ratios as previously indicated and optionally mixed prior to the blending step b) in order to obtain a homogenous particulate material mixture. This may require 1 to 60, preferably 1 to 20, in particular 2 to 10 minutes, depending to the amount of particulate material to be mixed.

The thus obtained homogenous particulate material mixture is then transferred to an optionally heatable mixing apparatus and blended therein, producing a substantially liquid-melt polymer mixture.

"Substantially liquid-melt" means that the polymer mixture, as well as the predominant liquid-melt (softened) fraction, may further comprise a certain fraction of solid constituents, examples being unmelted fillers and reinforcing material such as glass fibers, metal flakes, or else unmelted pigments, colorants, etc. "Liquid-melt" means that the polymer mixture is at least of low fluidity, therefore having softened at least to an extent that it has plastic properties.

Mixing apparatuses used are those known to the skilled person. Components (A) and (B), and—where included— (C), (D), (E) and/or (F) may be mixed, for example, by joint extrusion, kneading, or rolling, the aforementioned components necessarily having been isolated from the aqueous dispersion or from the aqueous solution obtained in the polymerization.

Examples of mixing apparatus for implementing the method includes discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders.

A preferred mixing apparatus used is an extruder or a kneader. Particularly suitable for melt extrusion are, for example, single-screw or twin-screw extruders. A twin-screw extruder is preferred.

In some cases the mechanical energy introduced by the mixing apparatus in the course of mixing is enough to cause the mixture to melt, meaning that the mixing apparatus does not have to be heated. Otherwise, the mixing apparatus is generally heated.

The temperature is guided by the chemical and physical properties of the styrene-based copolymer (A) and the inorganic metal compound nanoparticles (B) and—when present—the polymeric compatibilizing agent (C), the modified polysiloxane compound (D), the colorant, dye and/or pigment (E) and/or the further additives (F), and should be selected such as to result in a substantially liquid-melt polymer mixture. On the other hand, the temperature is not to be unnecessarily high, in order to prevent thermal damage of the polymer mixture. The mechanical energy introduced may, however, also be high enough that the mixing apparatus may even require cooling. Mixing apparatus is operated customarily at 150 to 400, preferably 170 to 300° C.

In a preferred embodiment a heatable twin-screw extruder and a speed of 50 to 150 rpm, preferably 60 to 100 rpm is employed. Preferably, an extruding temperature of 170 to 270° C., preferably 210 to 250° C. is employed to obtain the thermoplastic polymer composition (P). The thermoplastic polymer composition (P) may be directly used, e.g. in moulding processes, preferably injection moulding processes, or may be processed to form granules which may be subjected to moulding processes afterwards. The moulding processes are preferably carried out at temperatures of 170 to 270° C., in particular 210 to 250° C. to result in polymer moulded articles.

A further object of the invention is a polymer composition, comprising 50 to 99 wt.-% of the inventive thermoplastic polymer composition (P) and 50 to 1 wt.-% of at least one further thermoplastic polymer. In a preferred embodiment, the at least one further thermoplastic polymer is selected from styrene-based copolymers other than the styrene-based copolymer (A) (e.g. SAN, AMSAN or SMMA), polyolefins (e.g. polyethylene, polypropylene), polycarbonates, polyamides and mixtures thereof.

Processing may be carried out using the known processes for thermoplastic processing, in particular production may be effected by thermoforming, extruding, injection molding, calendaring, blow molding, compression molding, press sintering, deep drawing or sintering, preferably by injection molding.

The properties of the thermoplastic polymer composition (P) according to the present invention were determined. It was surprisingly found by the present inventors that the thermoplastic polymer composition (P) comprising 0.1 to 10 wt.-% of at least one inorganic metal compound nanoparticle (B) combines improved scratch resistance with good optical properties and low haze.

It was observed that the thermoplastic polymer composition (P) according to the invention in a scratch resistance test following ISO 1518-1 realized with an Erichsen Linear Tester preferably requires a minimum normal load of at least 300 g, more preferably of at least 500 g and in particular of at least 600 g to achieve a full scratch mark on the surface of the sample. By contrast, the minimum normal load necessary to achieve a full scratch mark on the surface of the sample of the styrene-based copolymer (A) in the absence of inorganic metal compound nanoparticles (B) is considerably lower. Moreover, it was found that the scratch resistance may further be increased by adding either at least one polymeric compatibilizing agent (C) and/or at least one modified polysiloxane compound.

Despite the presence of inorganic metal compound nanoparticles (B) in the thermoplastic polymer composition (P), it is possible to obtain articles having good optical properties with respect to transmission of visible light, haze and clarity (determined according to ASTM Standard D 1003). In particular, transmission of light is preferably reduced by less than 30%, preferably less than 25% and in particular less than 22% compared to a thermoplastic polymer composition (P) which does not comprise the at least one inorganic metal nanoparticle (B). Moreover, haze of the thermoplastic polymer composition (P) is below 20%, preferably below 10% and in particular below 5%. inorganic metal compound nanoparticle The invention is further illustrated by the examples and claims.

EXAMPLES

Materials
Constituent A:
A-1: A SAN copolymer comprising 75 wt.-% styrene and 25 wt.-% acrylonitrile. The SAN copolymer has a viscosity number of 80 cm$^3$/g, (DIN 53726, 25° C., 0.5% in DMF)
A*: As a comparative material, a commercial poly(methyl methacrylate) (PMMA) having a MVR (230/3.8) of about 6 cm$^3$/10 min was used (Plexiglas® 7N, available from Evonik Performance Materials GmbH, Germany)
Constituent B:
Four different inorganic metal compound nanoparticles (B) were employed:
B-1: ZnO nanoparticles having an average particle size of 5 nm were prepared according to the following preparation method:
a) Zinc oleate synthesis:
200 g (2 eq.) sodium oleate is dissolved in 1 l pre-warmed water. 55 g (1 eq.) zinc chloride are dissolved in a separate vessel in 0.5 l water and added to the zinc oleate solution. Solid zinc oleate is filtered off after 1 to 2 hours of stirring. The solid is dried. The product is obtained in quantitative yield.
b) ZnO nanoparticle synthesis: (B-1)
Tetrahydrofuran (THF) is heated to 60° C. (1 l THF per 100 g zinc oleate) followed by addition of zinc oleate, equimolar amount of KOH (1 M in methanol) is added and solution is stirred overnight, at room temperature, not reacted starting material and potassium oleate are separated by centrifugation, nanoparticles are precipitated with methanol and separated by centrifugation and redissolved in THF for further storage.

The size distribution of the ZnO nanoparticles B-1 was determined by dynamic light scattering in THF as a solvent with a Malvern® Zetasizer® Nano SZ.
B-2: ZnO nanoparticles, having an average particle size of 20 nm (purity: 99.5%, commercially available from loLiTec Ionic Liquids Technologies GmbH, Heilbronn, Germany)
B-3: ZrO$_2$ nanoparticles, having an average particle size of 100 nm (purity: 99.5%, commercially available from loLiTec Ionic Liquids Technologies GmbH, Heilbronn, Germany)
B-4: SnO$_2$ nanoparticles, having an average particle size of 20-30 nm (purity:
99.5%, commercially available from loLiTec Ionic Liquids Technologies GmbH, Heilbronn, Germany).
Constituent C:
Three different poly(styrene-acrylonitrile-maleic acid) terpolymers were prepared and used as polymeric compatibilizing agent C. The compatibilizers are obtained from monomer mixtures having the following compositions:

|  | Styrene | Acrylonitrile | Maleic acid anhydride |
|---|---|---|---|
| C-1 | 75.0 wt.-% | 23.5 wt.-% | 1.5 wt.-% |
| C-2 | 73.4 wt.-% | 25.1 wt.-% | 1.5 wt.-% |
| C-3 | 73.4 wt.-% | 25.1 wt.-% | 1.5 wt.-% |

The precise preparation of each poly(styrene-acrylonitrile-maleic acid) terpolymer is described in the following:
Preparation of Polymeric Compatibilizing Agent C-1:
A reaction vessel is charged with 1938.8 g demineralized water, 170.4 g of 7.4 wt.-% Dresinate®-3 solution (rosin soap), 56.3 g of styrene and 17.6 g of acrylonitrile. The mixture is stirred at 200 rpm and heated to 80° C. After reaching 80° C., the initiator system is added to reaction mixture: 240 g demineralized water, 2.9 g potassium peroxodisulfate, 18 g sodium hydroxide, 18 g sodium bicarbonate. Monomer and emulsifier feed are started 0.5 h later. 1068.8 g styrene, 334.9 g acrylonitrile, 22.5 g maleic acid anhydride and 3.15 g tert-dodecylmercaptane (monomer feed) are added over a time period of 5 h. In parallel a 7.4 wt.-% Dresinate®-3 solution (341 g) (emulsifier feed) is also added over a time period of 5 h. After 3 h another initiator shot is added, consisting of 74.8 g demineralized water, 1.6 g potassium peroxodisulfate, 0.23 g sodium hydroxide, 0.23 g sodium bicarbonate. After 4.5 h 240 g demineralized water, 18 g sodium hydroxide and 18 g sodium bicarbonate are added. After 5.5 h 32.6 g demineralized water, 0.7 g potassium peroxodisulfate, 0.15 g sodium hydroxide, 0.15 g sodium bicarbonate are added to the reaction mixture. After the monomer and emulsifier feed is finished the reaction mixture is polymerized for another 4 h at 80° C. The resulting latex has a pH of 10.1 and a total solid content of 35.38 wt.-%. To obtain the polymer the latex is coagulated with magnesium sulfate solution and dried in a lab oven for two days at 70° C. The polymeric compatibilizing agent C-1 had a weight average molecular weight Mw of 260,000 g/mol.
Preparation of Polymeric Compatibilizing Agent C-2:
A reaction vessel is charged with 2200 g demineralized water, 227.4 g of 7.4 wt.-% Dresinate®-3 Solution, 43.8 g of styrene and 15 g of acrylonitrile. The mixture is stirred at 180 rpm and heated to 80° C. After reaching 80° C. the initiator system is added to reaction mixture: 185.4 g demineralized water, 6 g potassium peroxodisulfate, 0.4 g sodium hydroxide, 0.4 g sodium bicarbonate. After 30 min 1416.2 g styrene, 485 g acrylonitrile, 30 g maleic acid anhydride and 2.8 g tert-dodecylmercaptane are added over a time period of 300 min. In parallel 500 g of 7.4 wt.-% Dresinate®-3 solution, 1000 g demineralized water and 41.2 g potassium hydroxide are added over a time period of 300 min. After 180 min 99.8 g demineralized water, 4 g potassium peroxodisulfate, 0.2 g sodium hydroxide, 0.2 g sodium bicarbonate are added to the reaction mixture. After 330 min 43.6 g demineralized water, 1.6 g potassium peroxodisulfate, 0.1 g sodium hydroxide, 0.1 g sodium bicarbonate are added to the reaction mixture. Afterwards the reaction mixture is polymerized for another 240 min at 80° C. The resulting latex has a total solid content of 33.1 wt.-% and a pH of 8.58. The polymeric compatibilizing agent C-2 had a weight average molecular weight Mw of 280,000 g/mol.
Preparation of Polymeric Compatibilizing Agent C-3:
A reaction vessel is charged with 2000 g demineralized water, 227.4 g of 7.4 wt.-% Dresinate®-3 Solution, 43.8 g of styrene and 15 g of acrylonitrile. The mixture is stirred at 180 rpm and heated to 80° C. After reaching 80° C. the initiator system is added to reaction mixture: 185.4 g demineralized water, 6 g potassium peroxodisulfate, 0.4 g sodium hydroxide, 0.4 g sodium bicarbonate. After 30 min 1416.2 g styrene, 485 g acrylonitrile, 30 g maleic acid anhydride and 2.8 g tert-dodecylmercaptane are added over a time period of 300 min. In parallel 200 g demineralized water and 11 g Mersolat H95 (sodium salt of C12 to C18 sec-alkyl sulfonic acid) are added over a time period of 300 min. A third feed is also added in parallel over a time period of 300 min: 1500 g demineralized water and 41.2 g potassium hydroxide. After 180 min 99.8 g demineralized water, 4 g potassium peroxodisulfate, 0.2 g sodium hydroxide, 0.2 g sodium bicarbonate are added to the reaction mixture. After 330 min 43.6 g demineralized water, 1.6 g potassium peroxodisulfate, 0.1 g sodium hydroxide, 0.1 g sodium bicarbonate are added to the reaction mixture. Afterwards the reaction mixture is polymerized for another 240 min at 80° C. The resulting latex has a total solid content of 33.1 wt.-% and a pH of 8.58. The polymeric compatibilizing agent C-3 had a weight average molecular weight Mw of 340,000 g/mol.

The weight average molecular weight Mw of the polymeric compatibilizing agents C-1, C-2 or C-3 was determined by gel permeation chromatography using UV-detection.

Polystyrene was used as standard. Tetrahydrofuran with 0.25 wt.-% tetrabutylammonium bromide was used as solvent.

Compatibilized Nanoparticles

In several examples, the inorganic metal compound nanoparticles B-1 were reacted with the polymeric compatibilizing agents C-1, C-2 or C-3 in order to obtain compatibilizer nanoparticles, which are then used in the preparation of the thermoplastic polymer composition (P) according to the invention. The reaction was carried out as follows: The total solid content of nanoparticle dispersion in THF was determined. The nanoparticle dispersion was added to a THF solution of the polymeric compatibilizing agent (C) in a mass ratio of 1:10. The mixture was stirred for several hours. Then, compatibilized nanoparticles were precipitated with cold methanol, the resulting solid was filtered (or centrifuged) off and dried.

The mass ratio of constituent B to constituent C was determined by thermogravimetric analysis using a Mettler-Toledo® TGA/SDTA 851e with a heating rate of 10 K/min for a temperature range of 30-500° C. followed by an isothermal process at 500° C. for 5 min under nitrogen atmosphere. The resultant residue corresponds to the pure ZnO in the compatibilizer nanoparticles.

The residue resulting from the compatibilizer nanoparticles B-1/C-1 was 10.5 wt.-%.

The ratio of constituent B-1 to constituent C-1 was therefore about 1:9.

The residue resulting from the compatibilizer nanoparticles B-1/C-2 was 12.4 wt.-%.

The ratio of constituent B-2 to constituent C-1 was therefore about 1:7.

The residue resulting from the compatibilizer nanoparticles B-1/C-3 was 11.1 wt.-%.

The ratio of constituent B-1 to constituent C-3 was therefore about 1:8.

Constituent D:

D-1: A polyester modified polysiloxane having a melting point of approximately 54° C. and a water content of <0.1% was used (commercially available as Tegomer® H-Si 6441P from Evonik Industries GmbH, Essen, Germany).

Sample Preparation

All samples have been prepared via kneading using a Haake™ Rheomix 600p (residence time 30 min, Volume 58 ml, rotational speed 30 rpm). The temperature for the kneading was 200° C. for Examples 1 to 3, respectively 230° C. for Example 4 to 7 and Comparative Example 1. The test specimens have been produced using a DSM Xplore® Micro Injection Molder (melt temperature: 230° C., mold temperature: 80° C., preheating time for polymer melt 2.5 min (for Examples 1 to 3) respectively 4 min (for Example 4 to 7 and Comparative Example 1). After injection molding the samples have been pressed using a Carver® 25-12-2HC hot press between Nowofol® PFA foils with a metal spacer (1.0 mm thickness); Temperature: 230° C., 2 min preheating, 1 min pressing with 6 t, cooling in water cooled press.

The composition of the samples according to Example 1 to 7 and Comparative Examples 1 and 2 are given in Table 1.

TABLE 1

| Example No. | Styrene-based copolymer (Constituent A) | Nanoparticles (Constituent B) | Polymer compatibilizing agent (Constituent C) | Modified polysiloxane compound (Constituent D) |
|---|---|---|---|---|
| Ex. 1 | 97 wt.-% A-1 (SAN) | 3 wt.-% B-2 (ZnO) | — | — |
| Ex. 2 | 97 wt.-% A-1 (SAN) | 3 wt.-% B-3 (SnO$_2$) | — | — |
| Ex. 3 | 97 wt.-% A-1 (SAN) | 3 wt.-% B-4 (ZrO$_2$) | — | — |
| Ex. 4 | 82.4 wt.-% A-1 (SAN) | 2 wt.-% B-1 (ZnO) | 15.6 wt.-% C-1 (S-AN-MSA) | — |
| Ex. 5 | 65.7 wt.-% A-1 (SAN) | 4 wt.-% B-1 (ZnO) | 30.3 wt.-% C-2 (S-AN-MSA) | — |
| Ex. 6 | 63.1 wt.-% A-1 (SAN) | 4 wt.-% B-1 (ZnO) | 32.9 wt.-% C-3 (S-AN-MSA) | — |
| Ex. 7 | 96 wt.-% A-1 (SAN) | 3 wt.-% B-4 (ZrO$_2$) | — | 1 wt.-% D-1 |
| Comp. Ex. 1 | 100 wt.-% A-1 (SAN) | — | — | — |
| Comp. Ex. 2 | 100 wt.-% A* (PMMA) | — | — | — |

Testing Methods

The properties of the thermoplastic polymer compositions (P) were evaluated by the following testing methods. The same methods were applied to determine the properties of the constituents (A) to (F), where necessary.

Scratch Resistance

Scratch resistance was tested using an Erichsen Linear Tester (Model 249) equipped with an indenter according to ISO 1518-1 (hard metal coating). Prior to testing all samples have been conditioned at 23° C./50% r.h. for 48 h. The indenter was moved with a speed of 100 mm/s over the surface of the sample (35 or 55 mm scratch path length). The normal load (force of the indenter) is adjusted by using a balance in the following steps 50 g, 100 g, 150 g, 200 g, 300 g, 400 g, 500 g, 600 g, 700 g, 800 g, 900 g, 1000 g for performing scratches beside the previous tested loads. After scratching the surface is evaluated in direct visual examination in reflection of diffuse daylight and/or fluorescent tube light in a geometry of 0° to 85° to the perpendicular line of the surface. The minimum loads (in g) to first achieve a scratch mark on the surface are recorded. A full scratch is identified by color changes, reflections by the formed hollows or surface roughness in parts of the scratch area respectively shown in the complete scratched area. Additionally the scratch appearance as well as the minimum loads are compared to the base material.

Optical properties were evaluated according to ASTM Standard D 1003 using BYK Gardner Hazemeter.

The test results are summarized in Table 2.

TABLE 2

| Example No. | min. load for full scratch [g] | Transmission [%] | Haze [%] |
|---|---|---|---|
| Ex. 1 | 300 | — | — |
| Ex. 2 | 500 | — | — |
| Ex. 3 | 600 | — | — |
| Ex. 4 | 700 | 82 | 9.7 |
| Ex. 5 | 700 | 71.7 | 3.6 |
| Ex. 6 | 700 | 74.9 | 4.8 |
| Ex. 7 | 800 | — | — |
| Comp. Ex. 1 | 100 | 93 | 0.9 |
| Comp. Ex. 2 | 600 | — | — |

Comparative Example 1 (pure SAN copolymer) shows only very limited scratch resistance. Already at 100 g normal load a full scratch mark is visible. On the other side Comparative Example 2 (pure PMMA, Plexiglas® 7N) shows significantly higher scratch resistance and required a minimum normal load of 600 g to achieve a full scratch mark. It was surprisingly found by the present inventors, that only small amounts of inorganic metal compound nanoparticles (B) are sufficient to significantly improve the scratch resistance of styrene-based copolymers.

As can be seen from the above samples containing inorganic metal compound nanoparticles (B) (Examples 1 to 7), these polymer compositions require significantly higher normal loads to form a visible scratch mark of up to 800 g. Further improvements, may be obtained by the addition of polymeric compatibilizing agents (Example 4 to 6) or modified polysiloxane compounds (Example 7). Example 7 shows even higher scratch resistance compared to the otherwise identical Example 3.

Most of the Examples Exceed Comparative Example 2 (PMMA) Serving as a Benchmark

Also in terms of scratch visibility the claimed samples are highly advantageous. Examples 4 to 6, comprising inorganic metal compound nanoparticles (B) in combination with a polymeric compatibilizing agent (C) in accordance with the invention, show good optical properties and are still transparent, despite the high inorganic metal compound nanoparticle (B) concentration.

The invention claimed is:

1. A thermoplastic polymer composition (P) comprising:
   (A) 40 to 98.9 wt.-% of at least one styrene-based copolymer;
   (B) 0.1 to 10 wt.-% of at least one inorganic metal compound nanoparticle;
   (C) 1 to 35 wt.-% of at least one polymeric compatibilizing agent;
   (D) 0 to 2 wt.-% of at least one modified polysiloxane compound;
   (E) 0 to 10 wt.-% of at least one colorant, dye, or pigment; and
   (F) 0 to 3 wt.-% of at least one further additive,
   wherein the constituents (A) to (F) sum up to 100 wt.-% of the thermoplastic polymer composition $(P)_1$ and
   wherein the at least one styrene-based copolymer (A) is selected from poly(styrene-co-acrylonitrile) (SAN), poly(α-methyl styrene-co-acrylonitrile) (AMSAN), poly(styrene-co-methyl methacrylate) (SMMA), and mixtures thereof.

2. The thermoplastic polymer composition (P) according to claim 1, wherein the at least one inorganic metal compound nanoparticle (B) is selected from ZnO, $SnO_2$, $ZrO_2$, WC, SiC, and $Al_2O_3$ nanoparticles.

3. The thermoplastic polymer composition (P) according to claim 1, wherein the at least one inorganic metal compound nanoparticle (B) is selected from ZnO, $SnO_2$, and $ZrO_2$ nanoparticles having an average particle diameter of between 10 and 120 nm.

4. The thermoplastic polymer composition (P) according to claim 1 comprising:
   (A) 42 to 98.5 wt.-% of at least one styrene-based copolymer;
   (B) 0.5 to 8 wt.-% of at least one inorganic metal compound nanoparticle;
   (C) 1 to 35 wt.-% of at least one polymeric compatibilizing agent;
   (D) 0 to 2 wt.-% of at least one modified polysiloxane compound;
   (E) 0 to 10 wt.-% of at least one colorant, dye, or pigment; and
   (F) 0 to 3 wt.-% of at least one further additive,
   wherein the constituents (A) to (F) sum up to 100 wt.-% of the thermoplastic polymer composition (P).

5. A thermoplastic polymer composition (P) comprising:
   (A) 40 to 99.8 wt.-% of at least one styrene-based copolymer;
   (B) 0.1 to 10 wt.-% of at least one inorganic metal compound nanoparticle;
   (C) 0 to 35 wt.-% of at least one polymeric compatibilizing agent;
   (D) 0.1 to 2 wt.-% of at least one modified polysiloxane compound;
   (E) 0 to 10 wt.-% of at least one colorant, dye, or pigment; and
   (F) 0 to 3 wt.-% of at least one further additive,
   wherein the constituents (A) to (F) sum up to 100 wt.-% of the thermoplastic polymer composition (P); and
   wherein the at least one styrene-based copolymer (A) is selected from poly(styrene-co-acrylonitrile) (SAN), poly(α-methyl styrene-co-acrylonitrile) (AMSAN), poly(styrene-co-methyl methacrylate) (SMMA), and mixtures thereof.

6. The thermoplastic polymer composition (P) according to claim 1 comprising:
   (A) 42 to 88.5 wt.-% of at least one styrene-based copolymer;
   (B) 1 to 8 wt.-% of at least one inorganic metal compound nanoparticle;
   (C) 10 to 35 wt.-% of at least one polymeric compatibilizing agent;
   (D) 0.5 to 2 wt.-% of at least one modified polysiloxane compound;
   (E) 0 to 10 wt.-% of at least one colorant, dye, or pigment; and
   (F) 0 to 3 wt.-% of at least one further additive,
wherein the constituents (A) to (F) sum up to 100 wt.-% of the thermoplastic polymer composition (P).

7. The thermoplastic polymer composition (P) according to claim 1, wherein the at least one modified polysiloxane compound (D) is a polyester modified polysiloxane.

8. The thermoplastic polymer composition (P) according to claim 1, wherein the at least one modified polysiloxane compound (D) is a polyester modified polysiloxane having a melting point between 40° C. and 70° C.

9. The thermoplastic polymer composition (P) according to claim 1, wherein the at least one modified polysiloxane compound (D) is a polyester-polysiloxane-block copolymer.

10. The thermoplastic polymer composition (P) according to claim 1, wherein the at least one modified polysiloxane compound (D) is a [polyester-b-polysiloxane-b-polyester] triblock copolymer or a [polysiloxane-b-polyester] brush copolymer.

11. The thermoplastic polymer composition (P) according to claim 1, wherein the at least one polymeric compatibilizing agent (C) is a copolymer obtained by copolymerizing a monomer mixture comprising styrene, acrylonitrile, and maleic acid anhydride and/or maleic acid.

12. The thermoplastic polymer composition (P) according to claim 1, wherein an article prepared from the thermoplastic polymer composition (P) requires a minimum normal load of at least 300 g in a scratch resistance test following ISO 1518-1 to achieve a full scratch mark on the surface of the article.

13. A process for the preparation of the thermoplastic polymer composition (P) according to claim 1, wherein the process comprises at least the following steps:
   a) providing the components (A) to (F) in the predetermined amounts to an optionally heatable mixing device; and
   b) blending the components (A) to (F) in the optionally heatable mixing device at temperatures above the glass transition point of the components (A) to (F) to obtain the thermoplastic polymer composition (P).

* * * * *